US005350616A

United States Patent [19]

Pan et al.

[11] Patent Number: 5,350,616

[45] Date of Patent: Sep. 27, 1994

[54] COMPOSITE ORIFICE PLATE FOR INK JET PRINTER AND METHOD FOR THE MANUFACTURE THEREOF

[75] Inventors: Alfred I. Pan, Sunnyvale, Calif.; Ellen R. Tappon, Corvallis, Oreg.

[73] Assignee: Hewlett-Packard Company, Palo Alto, Calif.

[21] Appl. No.: 78,691

[22] Filed: Jun. 16, 1993

[51] Int. Cl.$^5$ .................................................. B32B 3/10

[52] U.S. Cl. .................................... 428/131; 428/134; 428/195; 428/913; 428/914; 347/63

[58] Field of Search ...................... 346/75, 140 R, 134; 29/157; 428/913, 914, 195, 131, 134, 133-140

[56] References Cited

U.S. PATENT DOCUMENTS

| | | | |
|---|---|---|---|
| 4,282,533 | 8/1981 | Brooks et al. | 346/75 |
| 4,430,784 | 2/1984 | Brooks et al. | 29/157 |
| 4,694,308 | 9/1987 | Chan et al. | 346/140 R |
| 4,716,423 | 12/1987 | Chan et al. | 346/140 R |
| 4,809,428 | 3/1989 | Aden et al. | 29/611 |
| 5,159,353 | 10/1992 | Fasen et al. | 346/140 R |
| 5,208,604 | 5/1993 | Watanabe et al. | 346/1.1 |

*Primary Examiner*—Patrick J. Ryan
*Assistant Examiner*—William A. Krynski

[57] ABSTRACT

A composite orifice plate for a printer such as a thermal inkjet printer includes a first layer of non-wettable material and a second layer of wettable material joined to the first layer. In the orifice plate, at least one orifice is formed to extend through the first layer and at least one opening is formed to extend through the second layer, the orifice and opening are in fluid communication and aligned in an axial direction with an ink outlet located on a surface of the first layer facing away from the second layer and an ink inlet located on a surface of the second layer facing away from the first layer.

10 Claims, 1 Drawing Sheet

COMPOSITE ORIFICE PLATE FOR INK JET PRINTER AND METHOD FOR THE MANUFACTURE THEREOF

BACKGROUND OF THE INVENTION

Field of the Invention

The present invention generally relates to orifice plates for inkier printers and to processes for manufacture thereof.

State of the Art

In practice, the print quality of inkjet printers depends upon the physical characteristics of the nozzles in its printhead. For example, the geometry of a printhead orifice nozzle can affect the size, trajectory, and speed of ink drop ejection. Also, the geometry of a printhead orifice nozzle can affect the ink supply flow to the associated vaporization chamber.

FIG. 1 shows an example of a conventional inkjet printhead. The illustrated section of the printhead includes a silicon substrate 7, an intermediate polymer barrier layer 9, and an electroplated nozzle 11. In the nozzle plate 11, a nozzle orifice 13 is formed having an inlet area 14 and an outlet area 16. It should be understood that a conventional printhead has an array of such nozzle orifices with each nozzle orifice being paired with a vaporization cavity.

As further shown in FIG. 1, the silicon substrate 7 and the polymer barrier layer 9 together define a vaporization cavity 19 which is in fluid communication with the nozzle orifice 13. The vaporization cavity 19 is sometimes referred to as an ink drop ejection chamber.

Further in FIG. 1, it should be noted that a dead space 15 is formed where the surface of the barrier layer 9 separates from the converging sidewall 17 that defines the orifice 13 in the electroplated nozzle plate 11. Although such dead spaces are typical in conventional printheads for inkjet printers, they are problematical because they provide sites where static bubbles can be trapped. The trapped bubbles, in turn, can adversely affect the fluid dynamics of ejected drops.

It should be understood that, in a conventional inkjet printhead, a heater resistor (not shown in FIG. 1) is positioned within each vaporization cavity. Then, all of the heater resistors are connected in a network for selective activation. Also, a conventional printhead includes a channel (not shown in FIG. 1) that provides ink flow communication between each vaporization cavity and an ink supply reservoir.

In practice, the above-described conventional inkjet printhead has several shortcomings. For instance, conventional inkjet printheads have, a metal orifice plate that is inherently wettable and, therefore, provides a surface for ink runout over the outer surface of the orifice plate. The ink runout can cause a condition known as "ink puddling" that may create misdirection and spraying of ink droplets during ejection. On the other hand, it is desirable to have a nozzle orifice with a wettable interior so that the vaporization cavities can be smoothly refilled with ink.

Another shortcoming of the above-described conventional ink. jet printhead is that the orifice plates are conventionally formed by plating processes that fix the curvature of the nozzle to have a shape that is like a quarter circle. (The quarter circle shape is shown in cross-section in FIG. 1.) The quarter-circle shape is problematical, however, because it is difficult to increase the thickness of a nozzle plate without adversely affecting the architecture of the printhead while still maintaining the quarter-circle shape.

SUMMARY OF THE INVENTION

Generally speaking, the present invention provides a nozzle plate that reduces the entrapment of static bubbles while combining the benefits of wettable and non-wettable materials and providing easy nozzle architecture design changes. More particularly, the present invention provides a composite orifice plate for a printer, such as a thermal inkjet printer, that includes a first layer of non-wettable material and a second layer of wettable material joined to the first layer. At least one orifice extends through the first layer anti at least one opening extends through the second layer. The orifice and opening are in fluid communication and aligned in an axial direction. An ink outlet is located on a surface of the first layer facing away from the second layer and an inlet is located on a surface of the second layer facing away from the first layer.

In accordance with another aspect of the invention, the composite orifice plate includes a first layer of a first material with an orifice extending between opposed surfaces thereof and a second layer of a second material with an opening extending between opposite surfaces thereof. The first and second layers are joined together such that the orifice and the opening are in fluid communication and aligned in an axial direction. The opening is formed by sidewalls which converge towards the orifice and the orifice is formed by a substantially non-converging sidewalls.

In accordance with a further aspect of the invention, a method of manufacturing a composite orifice plate for a printer such as an inkjet printer is provided which includes coating a layer of polymer material with an adhesive layer, coating a layer of metal on the adhesion layer, providing at least opening through the layer of metal and providing an orifice through the layer polymer material. The orifice can be provided by photo-ablating the layer of polymer material using the layer of metal as a mask.

A composite orifice plate in accordance with the present invention eliminates problems associated with bubble trappage in conventional printheads while allowing the nozzle thickness to be easily varied.

BRIEF DESCRIPTION OF THE DRAWINGS

The present invention can be further understood with reference to the following description in conjunction with the appended drawings, wherein like elements are provided with the same reference numerals. In the drawings.

DETAILED DESCRIPTION OF THE PREFERRED EMBODIMENTS OF THE PRESENT INVENTION

Figure 1:
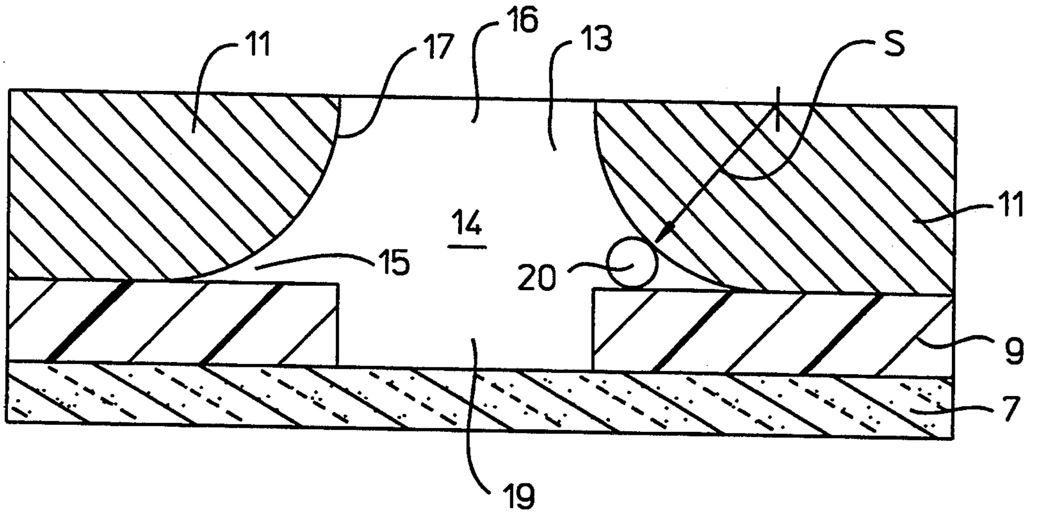
FIG. 1 (PRIOR ART)
FIG. 1 shows is a cross-sectional view, to an enlarged scale, of a conventional orifice plate.
Figure 2:
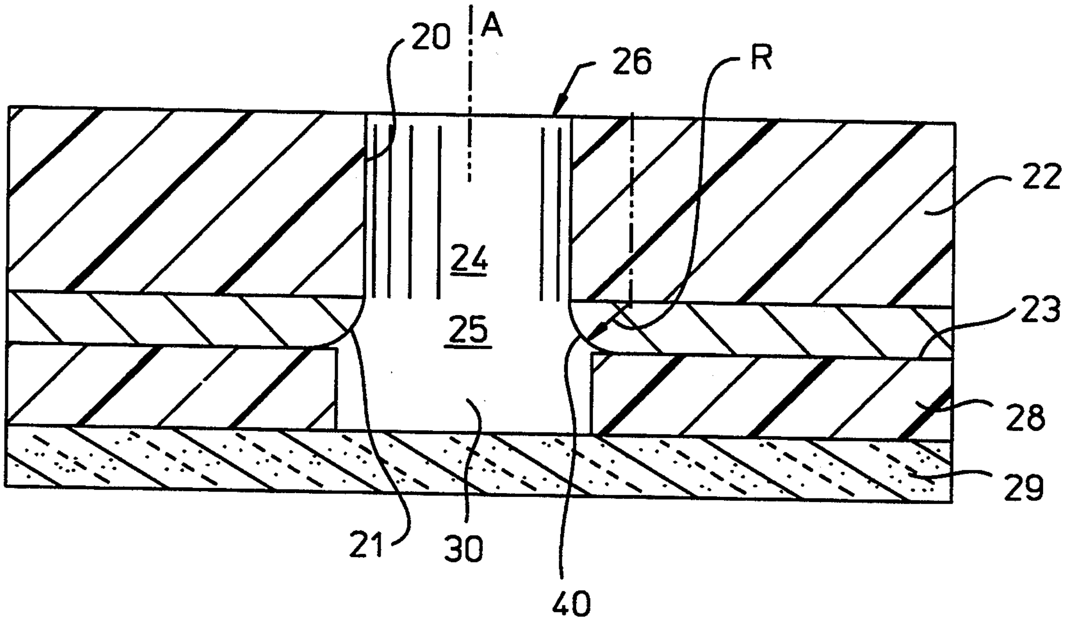
FIG. 2 is a cross-sectional view of a composite orifice plate in accordance with the present invention. It should be understood that, practice, a composite orifice plate includes a plurality of orifices, only one of which is shown in the drawing.

As shown in FIG. 2, a composite orifice plate according to the present invention includes a first layer 22 of a non-wettable material and a second layer 23 of a wettable material. A plurality of orifices 24, only one of which is shown in the drawing, is formed through the first layer 22. Also, a plurality of openings 25, only one of which is shown in the drawing, is formed through the second layer 23 such that each opening of the plurality is aligned in fluid flow communication with a corresponding one of the orifices 24 such that each pair of orifices 24 and openings 25 form a nozzle that has an outlet 26 on the outer surface of the first layer 22, and an inlet 30 on a surface of the second layer 23 facing away from the first layer 22. The orifices 24 and the openings 25 normally are circular in plan view and are symmetric about their vertical axis.

Preferably, the first layer 22 in the composite orifice plate of the present invention is a non-wettable polymer material such as a polyimide film, like "KAPTON" or "UPILEX."

The wettable second layer 23 preferably is formed of a metal material, such as nickel, that is more wettable than the first layer 22. Accordingly, the composite orifice plate has a non-wettable outer surface and a wettable (e.g., metallic) inner nozzle surface. The first layer 22 normally is at least twice as thick as the second layer 23 and, together, the two layers usually are about two mils thick.

It should be noted that, as shown in FIG. 2, the orifices 24 in the first layer 22 have a non-converging sidewall 20. By way of contrast, the openings 25 in the second layer 23 have an arcuate sidewalls 21. Preferably, the arcuately converging sidewall 21 has a radius of curvature (designated by the letter "R" in FIG. 2) which approximates to the total thickness of the second layer 23.

It should also be noted in FIG. 2 that a barrier layer 28 of polymer material is mounted to the second layer 23 on its side opposite the first layer 22 and that a silicon substrate 29 is mounted to the opposite side of the barrier layer 28. To the extent that a dead space 40 is created where the surface of the barrier layer 28 separates from the converging sidewall 21 of the second layer 23, the deleterious effects of the dead space can be minimized by forming the second layer 23 sufficiently thin that the dead space 40 is too small to trap bubbles. By using such a design, energy losses of ejected ink drops due to entrapper static bubbles in the dead spaces are minimized.

Thus, it can be appreciated that the above-described composite orifice plate eliminates problems associated with the above-described dead space while allowing the nozzle thickness to be easily varied.

Figure 3:
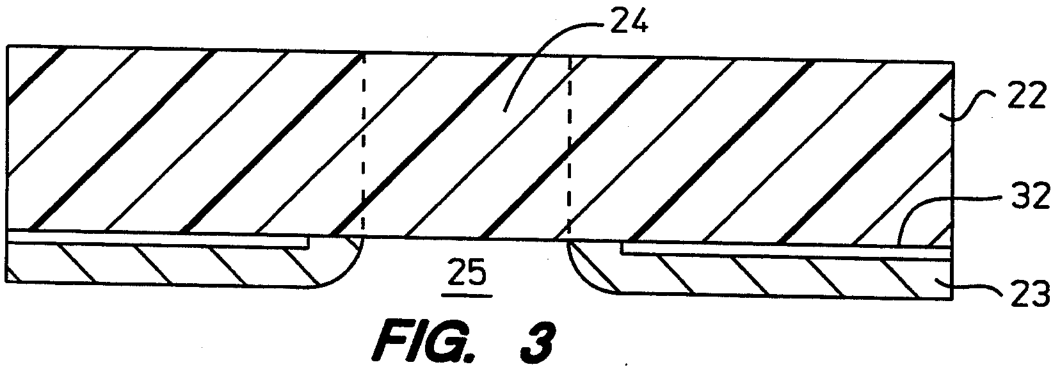
FIG. 3 is a cross-sectional view of a composite on rice plate, in accordance with the present invention, showing an intermediate stage of production.

Various methods can be used to form the composite orifice plate of the present invention. For example, during fabrication, one side of the polymer material of first layer 22 can be coated with an adhesion or seed layer 32 as shown in FIG. 3. The adhesion layer 32 can be, for example, a sputterdeposited layer of metal such as chromium or TaAl, or a combination thereof. The adhesion layer 32 can be patterned with photoresist so that the orifices 24 can be etched. In that case, the metallic second layer 23 is electroplate onto the adhesion layer 32 and built up to have the above-described arcuate converging walls 21 (FIG. 2) that form the openings 25 in the second layer.

When constructed as described above, the metal of second layer 23 can serve as a mask for photo-ablation. More particularly, the orifices 24 in the first layer can be photo-ablated through the polymer material by exposing the layer of metal of the second layer 23 to a beam of laser energy that passes into the first layer 22 of polymer material via the openings 25. After the orifices 24 are formed, the metal of the second layer 23 can be plasma etched to remove any soot formed by the photo-ablation step and render it wetruble.

Alternatively, the composite orifice plate of the present invention can be manufactured from a polymer/-metal composite material. In that case, the metal of the second layer 23 is patterned as a mask for laser ablation of the polymer material of the first layer 22. Following ablation, the metal of the second layer 23 can be plasma etched to remove soot and render it wettable.

In one particular process, the composite orifice plate is manufactured by coating a first layer 22 of polymer material with an adhesion layer 32. Patterns of a photoresist material, with lateral dimensions corresponding to those of the orifices 24, are formed on top of the adhesion layer 32. Then, the metal of the second layer 23 is electroplated. After electroplating, the photoresist material is removed, exposing areas of the adhesion layer that define the openings 25 for the orifices 24. Thereafter, the metal of the second layer 23 is used as a mask. With such a mask, the exposed areas of the adhesion layer 32 is etched off, and the orifices 24 are formed by photo-ablation through the first layer 22 of polymer material with a beam of laser energy radiating onto the second layer 23.

In an alternative process for manufacturing the above-described composite orifice plate, the polymer material of the first layer 22 is coated an adhesion layer 32 and is patterned with a photoresist material. The pattern defined by the photoresist material has areas of the adhesion layer 32 exposed, the areas having lateral dimensions corresponding to the orifices 24. The exposed adhesion layer 32 is etched. Then the photoresist material is removed, and the second layer 23 is formed on the adhesion layer 32, as shown in FIG. 3. Next, the orifices 24 are formed by photo-ablation of the polymer material using the metal of the second layer 23 as a mask.

In yet another alternative process for manufacturing the above-described . composite orifice plate, the metal comprising the second layer 23 is continuous and the openings 25 are formed by coating a layer of photoresist material onto the metal. In this case, the photoresist material is provided in a pattern that includes at least one open region whose size corresponds to the lateral dimensions of each of the orifices 24 in the polymer material of the first layer 22. The layer of metal comprising the second layer 23 is then etched through the open region in the photoresist material to provide the openings 25. Alter etching, the photoresist material is removed and, then, the metal layer is used as a mask for photo-ablation of the orifices 24 in the polymer material of first layer 22.

The foregoing has described the principle preferred embodiments and modes of operation of the present invention. However, the invention should not be construed as being limited to the particular embodiments discussed. Thus, the above-described embodiments should be regarded as illustrative rather than restrictive and it should be appreciated that variations may be made in those embodiments by workers skilled in the art without departing from the scope of the present invention as defined by the following claims.

What is claimed is:

1. A composite orifice plate for a printer such as a thermal ink jet printer, comprising:
- a first layer of non-wettable polymer material;
- a second layer of wettable material joined to the first layer;
- a barrier layer on the second layer; and
- at least one orifice extending through the first layer and at least one opening extending through the second layer, the orifice and the opening being in fluid communication and aligned in an axial direction with an ink outlet located on a surface of the first layer facing away from the second layer and an ink inlet located on a surface of the second layer facing away from the first layer, the opening being formed by converging sidewalls which converge towards the orifice;
- such that the barrier layer has a surface separated from the converging sidewalls of the second layer by a dead space, which is small enough to prevent static bubbles in the ink for printing from being trapped therein.

2. The composite orifice plate of claim 1, wherein the second layer comprises a metal.

3. The composite orifice plate of claim 2, wherein the orifice is formed by substantially non-converging sidewalls.

4. The composite orifice plate of claim 3, wherein the converging sidewalls are arcuate in shape and a radius of curvature thereof is about equal to a maximum thickness of the second layer.

5. The composite orifice plate of claim 3, further comprising a silicon substrate on the barrier layer, the barrier layer and the silicon substrate defining an ink drop ejection chamber in fluid communication and aligned in the axial direction with the opening and the orifice.

6. A composite orifice plate for a printer such as a thermal ink jet printer, comprising:
- a first layer of non-wettable polymer material with an orifice extending between opposed surfaces thereof;
- a second layer of wettable material with an opening extending between opposite surfaces thereof;
- a barrier layer on the second layer; and
- the first and second layers being joined together such that the orifice and the opening are in fluid communication and aligned in an axial direction, the opening being formed by sidewalls which converge towards the orifice and the orifice being formed by substantially non-converging sidewalls, and the sidewalls forming the orifice being thicker than the sidewalls forming the opening.

7. The composite orifice plate of claim 6 wherein the second layer comprises a metal.

8. The composite orifice plate of claim 7 wherein the converging sidewalls are arcuate in shape and a maximum thickness in the axial direction of the second layer is less than a maximum thickness in the axial direction of the first layer.

9. The composite orifice plate of claim 6 wherein the converging sidewalls are arcuate in shape and a radius of curvature thereof is about equal to a maximum thickness of the second layer.

10. The composite orifice plate of claim 6 further comprising a silicon substrate on the barrier layer, the barrier layer and the silicon substrate defining an ink drop ejection chamber in fluid communication and aligned in the axial direction with opening and the orifice, the barrier layer having a surface separated from the converging sidewalls of the second layer by a dead space, the dead space being small enough to prevent static bubbles in the ink of the printer from being trapped therein.

* * * * *